United States Patent
Park et al.

(10) Patent No.: US 8,934,834 B2
(45) Date of Patent: Jan. 13, 2015

(54) ON-CHANNEL REPEATER AND ON-CHANNEL REPEATING METHOD

(75) Inventors: Sung-Ik Park, Daejon (KR); Heung-Mook Kim, Daejon (KR); Jae-Hyun Seo, Daejon (KR); Ho-Min Eum, Daejon (KR); Jae-Young Lee, Seoul (KR); Yong-Tae Lee, Daejon (KR); Jong-Soo Lim, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1065 days.

(21) Appl. No.: 12/599,457

(22) PCT Filed: Nov. 9, 2007

(86) PCT No.: PCT/KR2007/005644
§ 371 (c)(1),
(2), (4) Date: Aug. 17, 2010

(87) PCT Pub. No.: WO2008/140162
PCT Pub. Date: Nov. 20, 2008

(65) Prior Publication Data
US 2010/0311323 A1 Dec. 9, 2010

(30) Foreign Application Priority Data
May 9, 2007 (KR) .................. 10-2007-0045235

(51) Int. Cl.
*H04M 1/00* (2006.01)
*H04B 7/155* (2006.01)
(52) U.S. Cl.
CPC ............... *H04B 7/15585* (2013.01)
USPC ..................... 455/11.1; 455/550.1

(58) Field of Classification Search
USPC ............ 455/7, 11.1, 13.1, 15, 16, 505
See application file for complete search history.

(56) References Cited

U.S. PATENT DOCUMENTS

| | | |
|---|---|---|
| 2005/0058104 A1* | 3/2005 | Yomo et al. .................. 370/335 |
| 2005/0190822 A1 | 9/2005 | Fujii et al. |
| 2005/0191961 A1 | 9/2005 | Kunieda et al. |

(Continued)

FOREIGN PATENT DOCUMENTS

| | | |
|---|---|---|
| EP | 1039716 A1 | 9/2000 |
| JP | 2000-341243 A | 12/2000 |
| JP | 2002-077096 A | 3/2002 |
| JP | 2003-174430 A | 6/2003 |
| JP | 2003-273830 A | 9/2003 |

(Continued)

*Primary Examiner* — Tu X Nguyen
(74) *Attorney, Agent, or Firm* — Rabin & Berdo, P.C.

(57) ABSTRACT

Provided are an on-channel repeater and an on-channel repeating method. The on-channel repeater includes: a receiving means for receiving a Radio Frequency (RF) signal; a subtracting means for subtracting a replica of feedback signals from the signal received by the receiving means; a replica generating means for calculating the replica based on the signal acquired from the subtraction in the subtracting means and feeding back the replica to the subtracting means; an inverse channel estimating means for estimating inverse of a reception channel based on the signal acquired from the subtraction in the subtracting means and generating filter tab coefficients; a first adaptive filtering means for compensating for channel distortion of the signal subtracted by the subtracting means based on the filter tab coefficients generated in the inverse channel estimating means; and a transmitting means for converting a signal whose channel distortion is compensated by the first adaptive filtering means into an RF signal and performing radio transmission.

28 Claims, 14 Drawing Sheets

(56) References Cited

U.S. PATENT DOCUMENTS

2006/0013183 A1 1/2006 Lee et al.
2006/0264174 A1 11/2006 Moss

FOREIGN PATENT DOCUMENTS

| JP | 2006-060498 A | 3/2006 |
| WO | WO-2006/115320 A1 | 11/2006 |

* cited by examiner

US 8,934,834 B2

ON-CHANNEL REPEATER AND ON-CHANNEL REPEATING METHOD

TECHNICAL FIELD

The present invention relates to an on-channel repeater and an on-channel repeating method; and, more particularly, to a repeater for repeating an output signal the same as an input signal through on-channel by removing feedback signals caused by low isolation of a transmission/reception antenna from a received Radio Frequency (RF) signal and compensating for channel distortion of the reception signal by estimating inverse of a reception channel from a signal acquired by removing the feedback signal, and an on-channel repeating method thereof.

BACKGROUND ART

Repeaters are set up in an area where signals are weakly received from a main transmitter to resolve a problem of instable signal reception and widen signal transmission coverage of the main transmitter.

FIG. 1 shows a conventional repeating system where different frequencies are used among the repeaters.

Referring to FIG. 1, a main transmitter 101 transmits a signal of a frequency A and each of repeaters 102 to 105 repeats a signal of frequencies B, C, D and E, respectively, which are different from the frequency A. The conventional repeating system uses signals of the frequencies B, C, D and E, which are different for the repeater 102 to 105 respectively. Since a plurality of frequency bands are used, many frequency resources are required and it is inefficient in the respect of using the frequency.

FIG. 2 shows another conventional repeating system where the same frequency is used among repeaters.

A main transmitter 201 transmits a signal of a frequency A and on-channel repeaters 202 to 205 repeat the signal in the same frequency A. The signals of the same frequency transmitted from the main transmitter 201 and the on-channel repeaters 202 to 205 should be individually identified for on-channel repeating.

However, when the signals of the same frequency band outputted from the main transmitter and the repeaters are different, the signals are not removed as on-channel interference signals by an equalizer or other devices in each repeater.

Also, when the signals transmitted from the main transmitter and the on-channel repeaters have a time delay longer than a predetermined level, the equalizer cannot remove the delayed signal. Therefore, the output signals of the on-channel repeater should be the same as the output signals of the main transmitter for on-channel repeating, and the time delay of two output signals should be short.

Problems of the conventional on-channel repeaters will be described with reference to FIGS. 3 to 7.

FIG. 3 is a block diagram showing a conventional RF amplification on-channel repeater.

Referring to FIG. 3, a reception antenna 301 and an RF receiver 302 receive RF signals transmitted from the main transmitter. An RF band-pass filter 303 passes only signals of a predetermined signal band in the received RF signals and a high-power amplifier 304 amplifies the band-passed RF signals. The amplified RF signal is transmitted through on-channel through a transmission antenna 305.

FIG. 4 is a block diagram showing a conventional Intermediate Frequency (IF) conversion on-channel repeater.

Referring to FIG. 4, a reception antenna 401 and an RF receiver 402 receive RF signals transmitted from the main transmitter. An IF down-converter 403 converts the received RF signals into IF signals based on a reference frequency provided by a local oscillator (LO) 408. An IF band-pass filter 404 passes the IF signals of a predetermined band. An RF up-converter 405 converts the band-passed IF signals into n RF signals based on the reference frequency provided by the local oscillator 408. A high-power amplifier 406 amplifies the RF signals and the amplified RF signals are transmitted through a transmission antenna 407.

FIG. 5 is a block diagram showing a conventional on-channel repeater employing surface acoustic wave (SAW) filter.

Referring to FIG. 5, a reception antenna 501 and an RF receiver 502 receive RF signals transmitted from the main transmitter and an IF down-converter 503 converts the received RF signals into IF signal based on a reference frequency provided by a local oscillator 508.

A SAW filter 504 passes IF signals of a predetermined band. An RF up-converter 505 converts the band-passed IF signals into RF signals based on the reference frequency provided by the local oscillator 508. A high-power amplifier 506 amplifies the RF signals and the amplified RF signals are transmitted through a transmission antenna 507.

Since the on-channel repeater of FIGS. 3 to 5 cannot remove noise and multi-path signals caused in a channel between the main transmitter and the on-channel repeater, feedback signals caused by low isolation of a transmission/reception antenna, and system noise added in an on-channel repeater system, it has a characteristic that an output signal is inferior than an input signal. Also, there is another problem in that the feedback signals generated due to the low isolation of the transmission and reception antennas restrict the transmission output power of the on-channel repeaters.

FIG. 6 is a block diagram showing a conventional on-channel repeater performing a modulating/demodulating procedure.

Referring to FIG. 6, a reception antenna 601 and an RF receiver 602 receive RF signals transmitted from the main transmitter. An IF down-converter 603 converts the received RF signals into IF signals based on a reference frequency provided by a local oscillator 611. A demodulator 604 demodulates the IF signals into baseband signals. An equalizing and forward error correction (FEC) decoding unit 605 remove noise and multi-path signals caused in a channel between the main transmitter and the on-channel repeater from the demodulated baseband signal, and feedback signals caused by low isolation of a transmission/reception antenna. A FEC decoder 606 performs coding for error correction of output signals of the equalizing and FEC decoding unit 605. A modulator 607 converts the FEC encoded signals into signals of an IF band. An RF up-converter 608 converts the IF signals into an RF signal based on a reference frequency provided by a local oscillator 611. A high-power amplifier 609 amplifies the RF signals and the amplified RF signals are transmitted through a transmission antenna 610.

Through the equalizing and FEC decoding unit, the on-channel repeater of FIG. 6 improves the multi-path and noise removing capability which is the problem of the repeater shown in FIGS. 3 to 5. However, since the on-channel repeater includes the equalizing and FEC decoding unit, it increases time delay from a microsecond unit to a millisecond unit. In addition, the transmission output power is limited when the feedback signals generated by ambiguity of a standard Trellis encoder of the FEC encoder is not removed in the repeater.

FIG. 7 is a block diagram showing a conventional on-channel repeater capable of compensating for distortion of a reception channel.

Referring to FIG. 7, an RF receiver 701 receives RF signals transmitted from the main transmitter and a down-converter 702 converts the received RF signals into signals of a desired band.

An inverse channel estimator 703 estimates an inverse of the reception channel including noise and multi-path signals caused in a channel between the main transmitter and the repeater from the converted signal, and feedback signals caused by low isolation of a transmission/reception antenna.

An adaptive filter 704 compensates for channel distortion based on inverse information of the estimated reception channel.

An up-converter 705 converts the compensated signals into RF signal and an RF transmitter 706 transmits the converted RF signals.

When the electric field strength of feedback signals (which are caused by low isolation of the transmission and reception antennas) is higher than the electric field strength of the input signal transmitted from main transmitter, the on-channel repeater of FIG. 7 does not remove distortion signals in the adaptive filter and does not estimate an inverse of the reception channel in the inverse channel estimator, thereby causing malfunction of the repeater.

Since the conventional technologies have a limitation in their removing capability of feedback signals, the conventional on-channel repeating systems have a low applicability in using a typical repeating facility and require a great deal of investment.

Therefore, it is required to develop an on-channel repeater having characteristics that the output signals of the on-channel repeater is the same as the output signals of the main transmitter, that the time delay between two output signals is small, that a characteristic of the on-channel repeater output signal becomes superior to that of the on-channel repeater input signal by removing the noise and multi-path signals caused in the channel between the main transmitter and the on-channel repeater, and that the applicability is raised and the small amount of investment is required by increasing transmission output power of the on-channel repeater by removing the feedback signals caused by the low isolation of transmission and reception antennas in the on-channel repeater.

DISCLOSURE

Technical Problem

An embodiment of the present invention is directed to providing a repeater for repeating an output signal the same as an input signal through on-channel by removing feedback signals caused by low isolation of a transmission/reception antenna from a transmitted Radio Frequency (RF) signal and compensating for channel distortion of a reception signal by estimating an inverse of a reception channel from a signal acquired by removing the feedback signal, and an on-channel repeating method.

Technical Solution

In accordance with an aspect of the present invention, there is provided an on-channel repeater, including: a receiving means for receiving a Radio Frequency (RF) signal; a subtracting means for subtracting a replica of feedback signals from the signal received by the receiving means; a replica generating means for calculating the replica based on the signal acquired from the subtraction in the subtracting means and feeding back the replica to the subtracting means; an inverse channel estimating means for estimating an inverse of a reception channel based on the signal acquired from the subtraction in the subtracting means and generating filter tab coefficients; a first adaptive filtering means for compensating for channel distortion of the signal subtracted by the subtracting means based on the filter tab coefficients generated in the inverse channel estimating means; and a transmitting means for converting a signal whose channel distortion is compensated by the first adaptive filtering means into an RF signal and performing radio transmission.

In accordance with another aspect of the present invention, there is provided an on-channel repeating method, including: receiving a Radio Frequency (RF) signal; subtracting a replica of feedback signals from the received signal; estimating an inverse of a reception channel based on a signal acquired from the subtraction and generating filter tab coefficients; compensating for channel distortion of the signal acquired from the subtraction based on the generated filter tab coefficients; and converting the signal whose channel distortion is compensated into an RF signal and performing radio transmission, wherein the replica is calculated based on the signal acquired from the subtraction and is fed back to said subtracting the replica of the feedback signal.

Advantageous Effects

As described above, the present invention can increase efficiency of limited frequency resources by repeating a signal that is the same as the output signal of a main transmitter, has a short time delay between the output signals of the repeater and the main transmitter, and has its distortion caused in a transmission channel compensated.

BEST MODE FOR THE INVENTION

The advantages, features and aspects of the invention will become apparent from the following description of the embodiments with reference to the accompanying drawings, which is set forth hereinafter.

The preferred embodiments of the present invention will be described in detail hereinafter with reference to the attached drawings.

Figure 1:
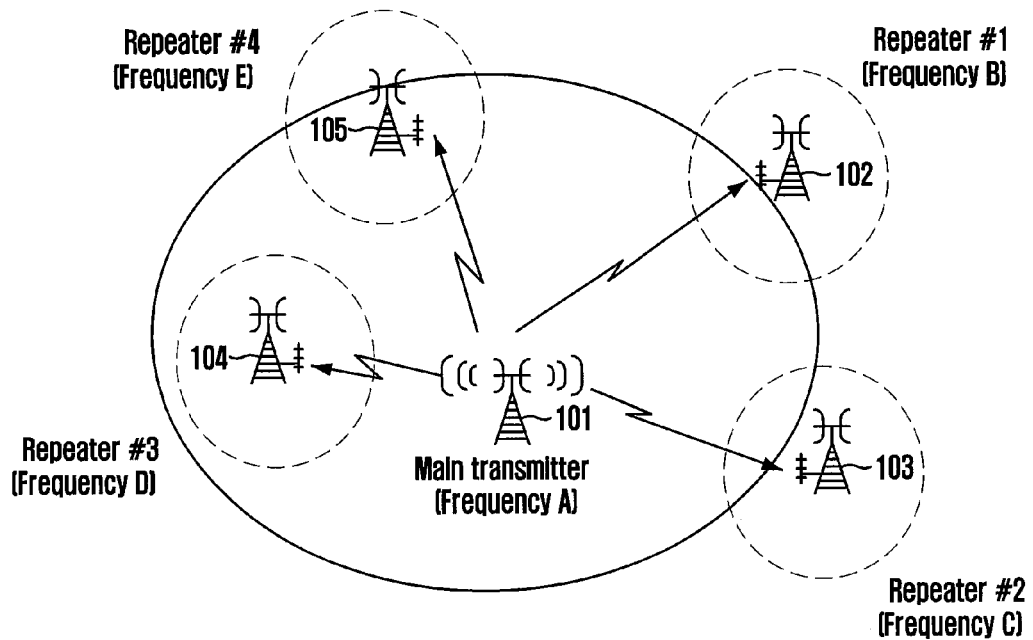
FIG. 1 shows a conventional repeating system using different frequencies.
Figure 2:
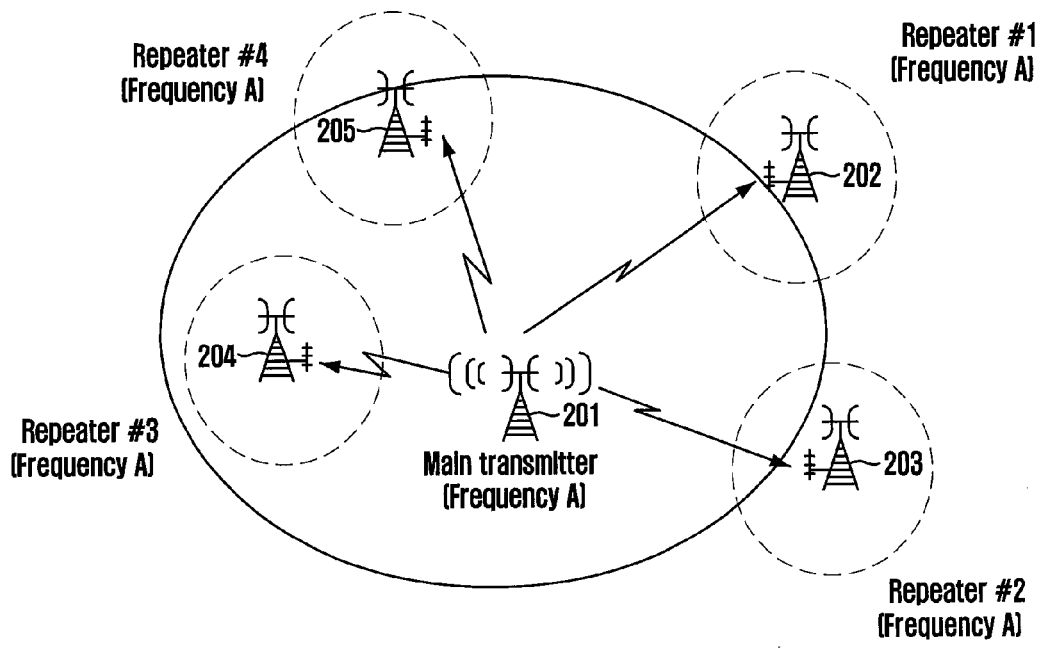
FIG. 2 shows a conventional repeating system using the same frequency.
Figure 3:
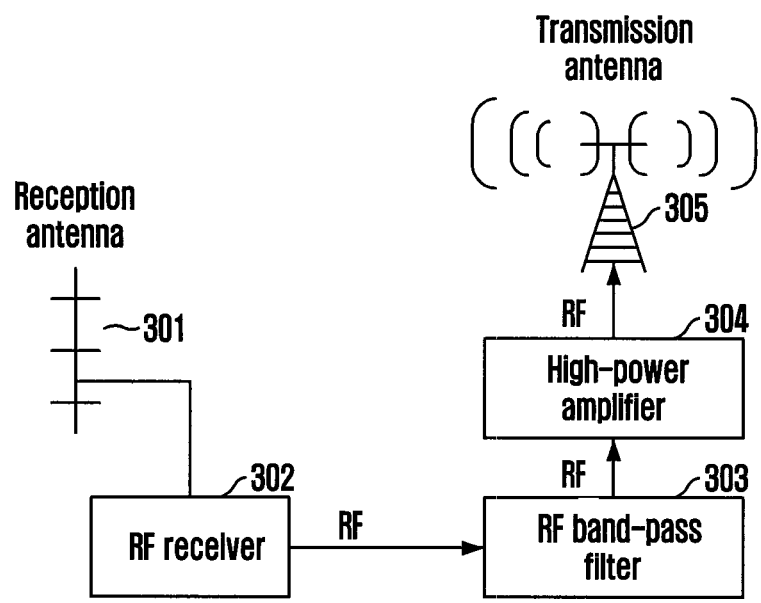
FIG. 3 is a block diagram showing a conventional Radio Frequency (RF) amplification on-channel repeater.
Figure 4:
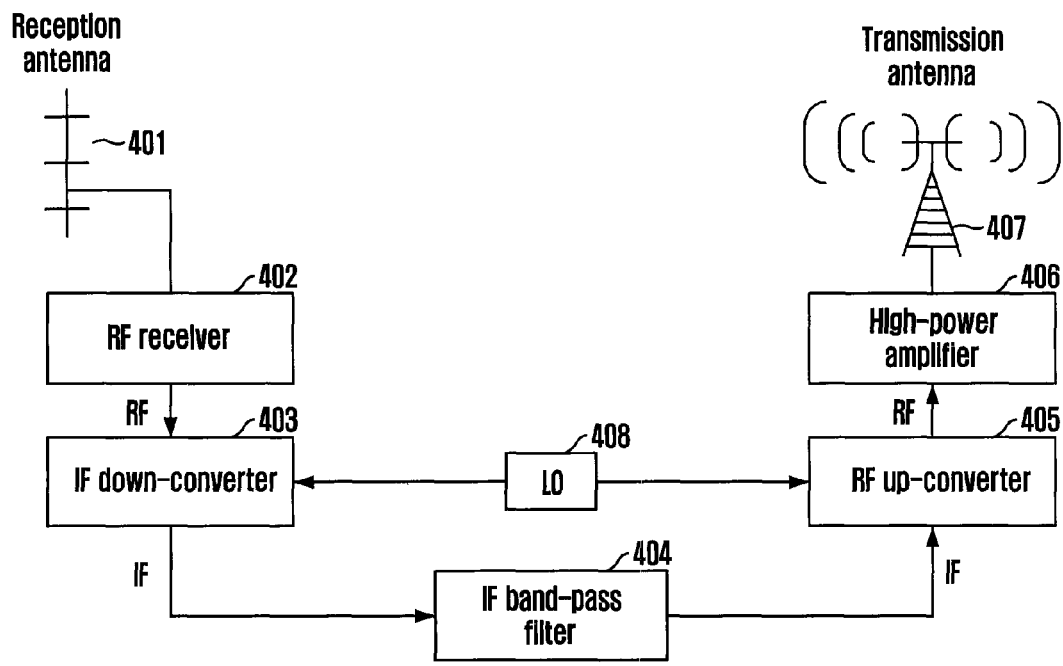
FIG. 4 is a block diagram showing a conventional Intermediate Frequency (IF) conversion on-channel repeater.
Figure 5:
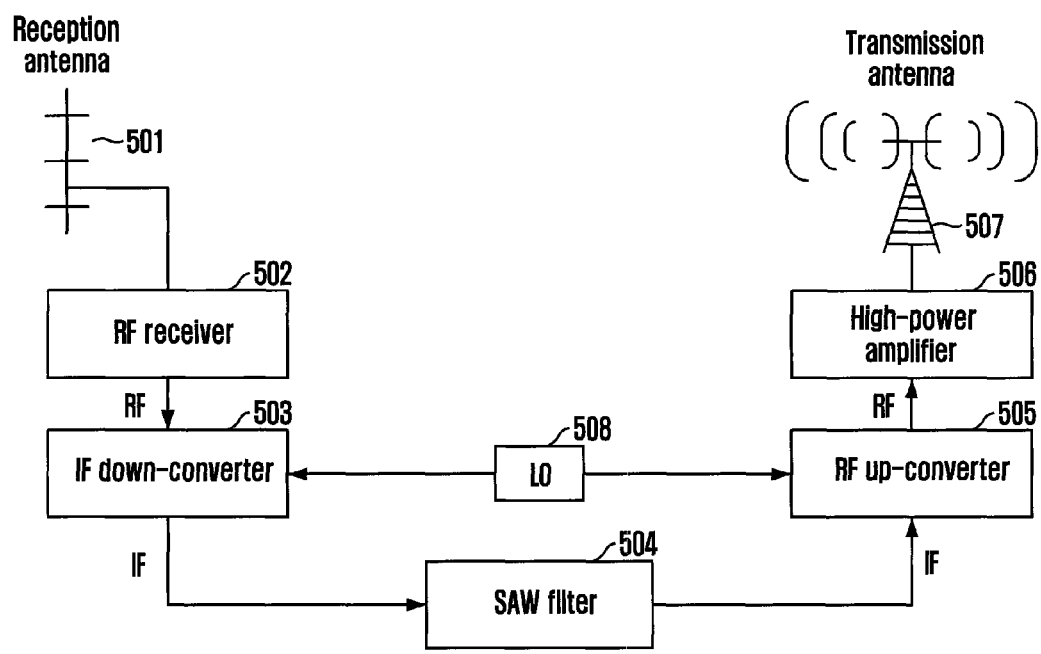
FIG. 5 is a block diagram showing a conventional on-channel repeater employing a surface acoustic wave (SAW) filter.
Figure 6:
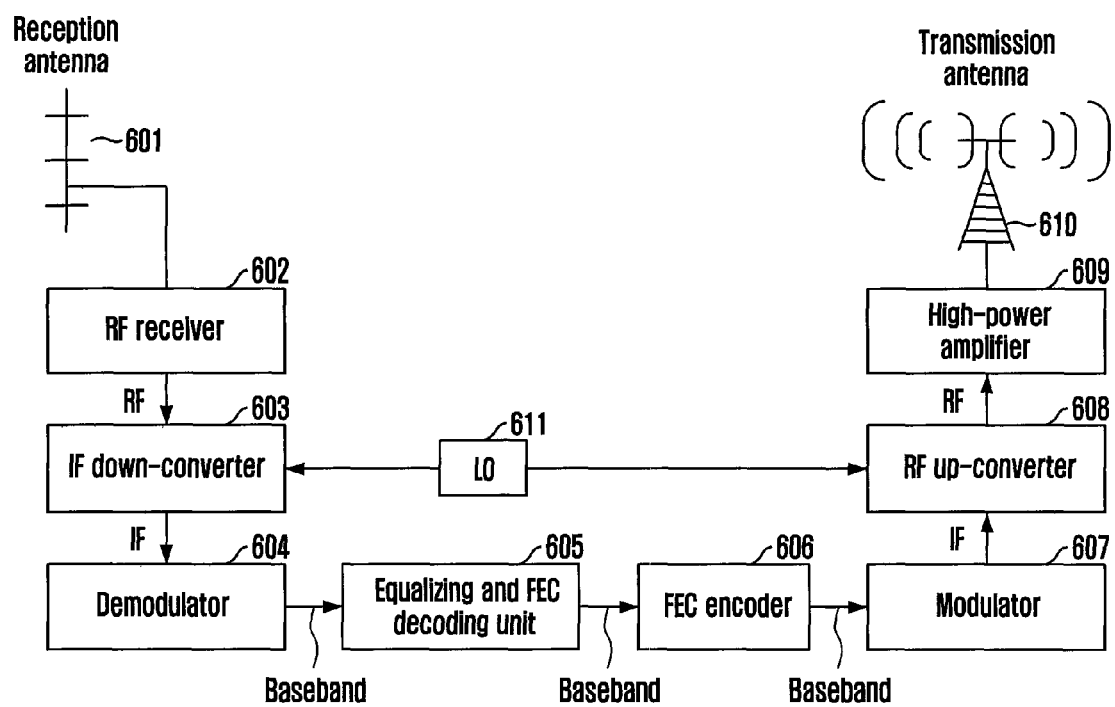
FIG. 6 is a block diagram showing a conventional on-channel repeater performing a modulation/demodulation.
Figure 7:
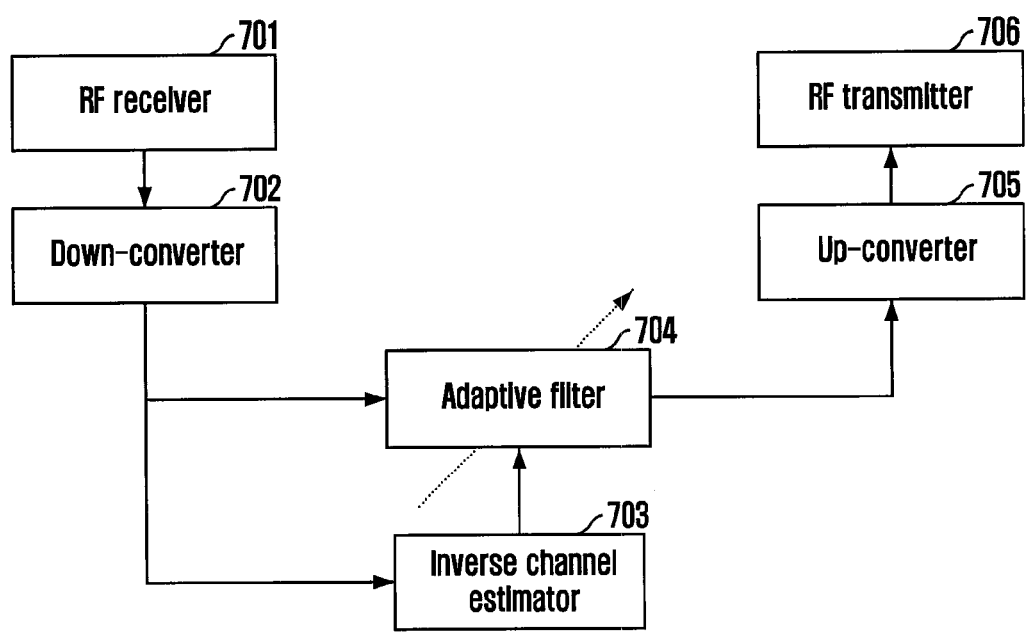
FIG. 7 is a block diagram showing a conventional on-channel repeater compensating distortion of a reception channel.
Figure 8:
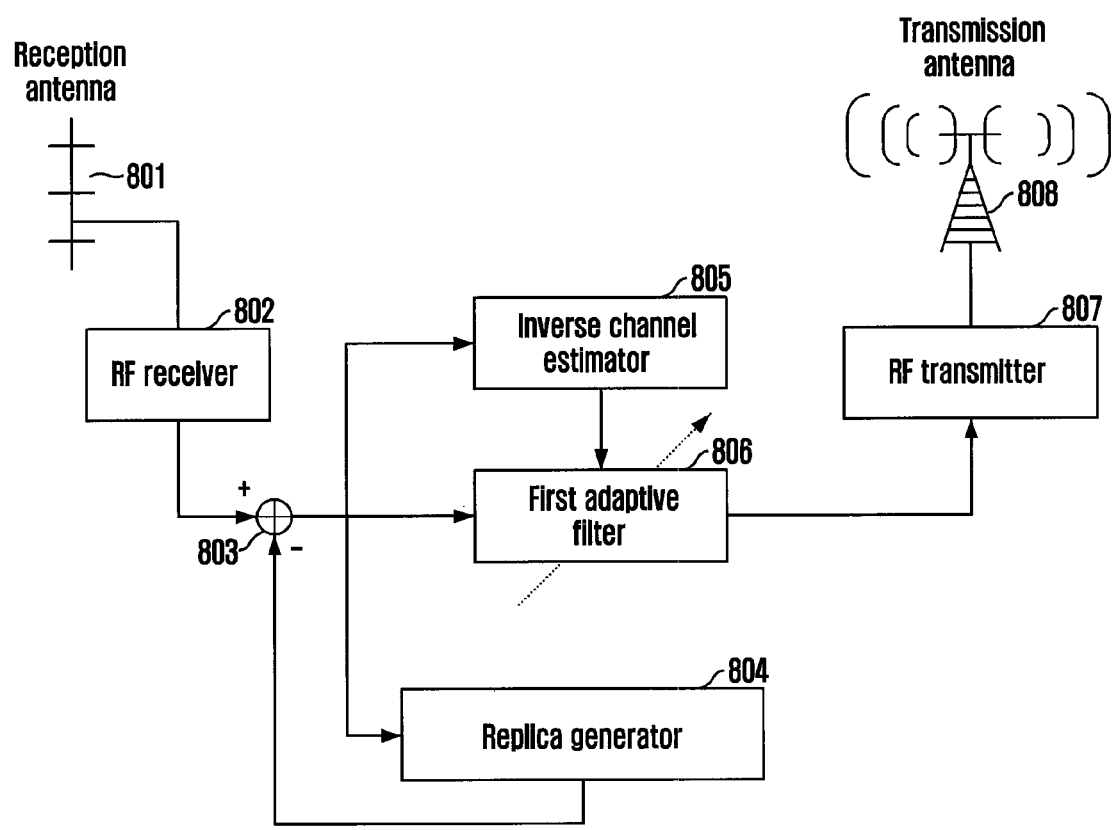
FIG. 8 is a block diagram showing an on-channel repeater in accordance with an embodiment of the present invention.

FIG. 8 is a block diagram showing an on-channel repeater in accordance with an embodiment of the present invention.

Referring to FIG. 8, the on-channel repeater in accordance with the present invention includes a reception antenna 801, a Radio Frequency (RF) receiver 802, a subtractor 803, a replica generator 804, an inverse channel estimator 805, a first adaptive filter 806, an RF transmitter 807, and an RF transmission antenna 808.

The RF receiver 802 down-converts an RF signal transmitted from a main transmitter or another repeater through the reception antenna 801 into a signal of a desired band.

The subtractor 803 removes feedback signals by subtracting a replica of feedback signals from the predetermined band signal down-converted by the RF receiver 802. The replica generator 804 generates a replica of feedback signals based on the signal outputted from the subtractor 803 where the feedback signals are primarily removed, and feeds back the replica of the feedback signals to the subtractor 803.

The inverse channel estimator 805 generates filter tab coefficients by estimating an inverse of a reception channel including noise, multi-path signals and remaining feedback signals based on the signal outputted from the subtractor 803. Herein, the remaining feedback signals mean feedback signals which are not removed through subtraction of the subtractor 803.

In accordance with the present invention, the subtractor 803 and the replica generator 804 only remove the feedback signals but do not affect the processing delay of the repeater system.

The first adaptive filter 806 compensates for the channel distortion of the signal outputted from the subtractor 803 by performing filtering according to Equation 1 based on the filter tab coefficients generated by the inverse channel estimator 805.

$$z_n = \sum_{i=0}^{N-1} c_i y_{n-i}$$ Eq. 1 where $y_n$ is an output signal of the subtractor 803; $z_n$ is an output signal of the first adaptive filter 806; $C_i$ is a tab coefficient $\bar{c} = (c_0, c_1, \ldots, c_{N-1})$ estimated by the inverse channel estimator 805; and N is the number of tabs.

The RF transmitter 807 converts the signal outputted from the first adaptive filter 806 into an RF signal and transmits the converted signal into the air through the transmission antenna 808.

Figure 9:
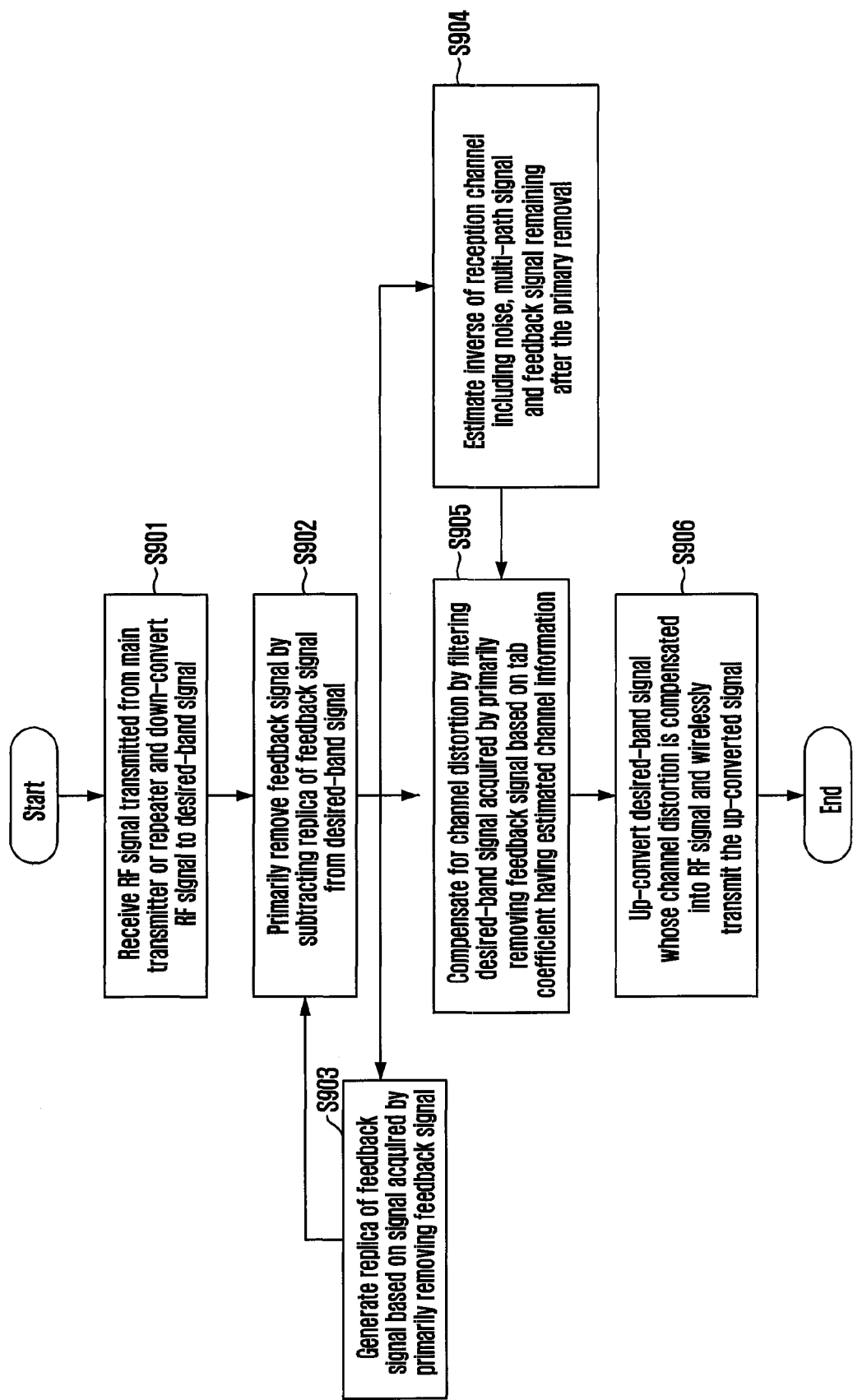
FIG. 9 is a flowchart describing a repeating method executed in the on-channel repeater of FIG. 8.

FIG. 9 is a flowchart describing a repeating method in the on-channel repeater of FIG. 8.

Referring to FIG. 9, an RF signal transmitted from the main transmitter or another repeater is received through the reception antenna 801 and is down-converted into a signal of a desired band in the RF receiver 802 at step S901.

The subtractor 803 removes feedback signals from the output signal of the RF receiver 802 at step S902 by subtracting a replica of the feedback signal generated in the replica generator 804 from the signal outputted from the RF receiver 802.

The replica generator 804 generates a replica of the feedback signal based on the signal outputted from the subtractor 803, i.e., the signal acquired by removing the feedback signal, and feeds back the replica of the feedback signal to the subtractor 803 at step S903.

The inverse channel estimator 805 generates a filter tab coefficients by estimating an inverse of the reception channel including noise, multi-path signals and remaining feedback signals based on the signal outputted from the subtractor 803 at step S904.

The first adaptive filter 806 compensates for the channel distortion of the signal outputted from the subtractor 803 based on the filter tab coefficients generated by the inverse channel estimator 805 at step S905.

The RF transmitter 807 converts the signal outputted from the first adaptive filter 806 into an RF signal and performs radio transmission through the transmission antenna 808 at step S906.

Figure 10:
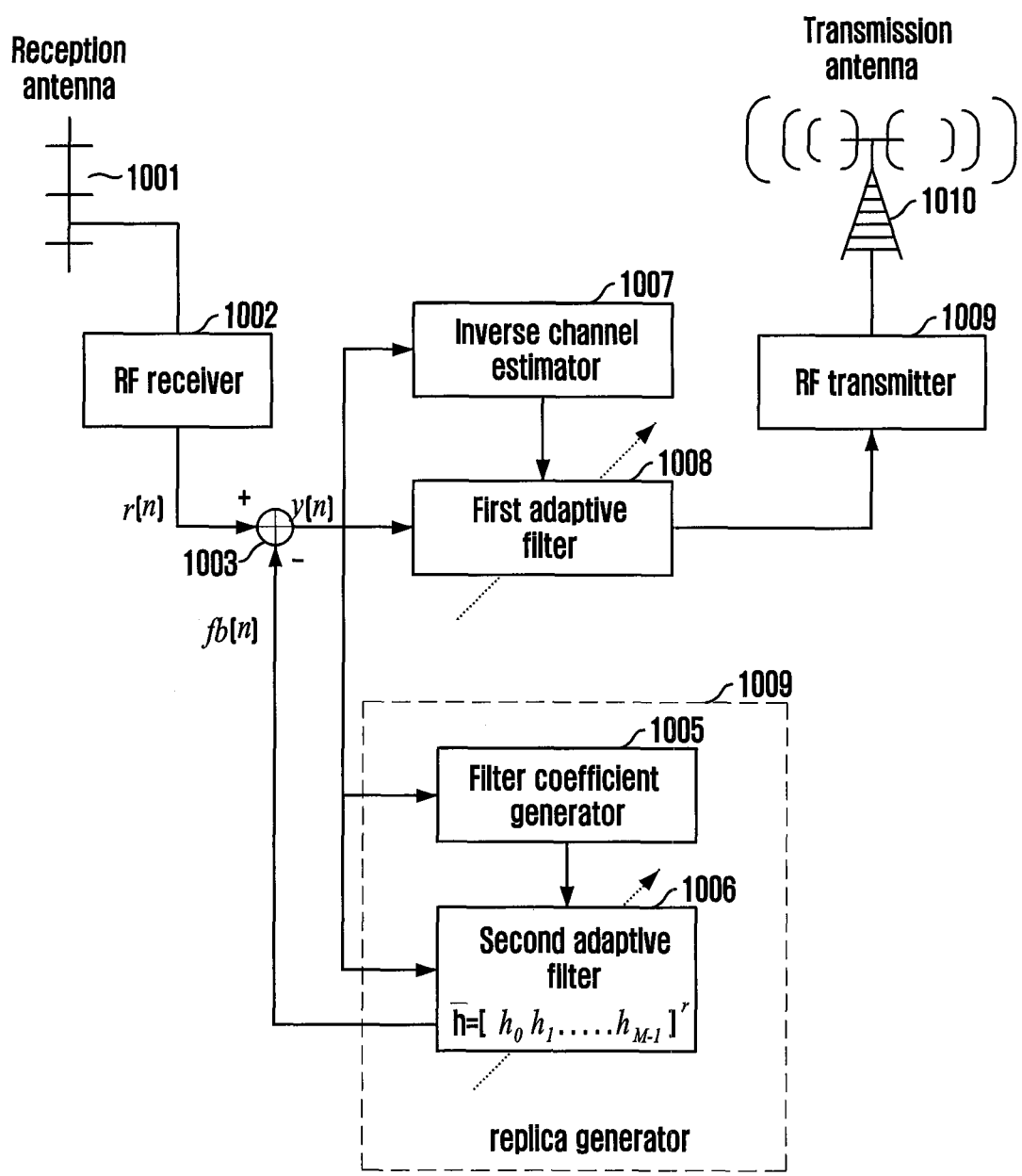
FIG. 10 is a block diagram illustrating the on-channel repeater of FIG. 8.

FIG. 10 is a block diagram illustrating the on-channel repeater of FIG. 8.

A reception antenna 1001, an RF receiver 1002, an inverse channel estimator 1007, a first adaptive filter 1008, an RF transmitter 1009, and the transmission antenna 1010 correspond to the reception antenna 801, the RF receiver 802, the inverse channel estimator 805, the first adaptive filter 806, the RF transmitter 807, and the transmission antenna 808 of FIG. 8.

Meanwhile, a replica generator 1009 includes a filter coefficient generator 1005 and a second adaptive filter 1006. The filter coefficient generator 1005 generates a filter tab coefficients used in the second adaptive filter 1006 based on the signal outputted from a subtractor 1003. The second adaptive filter 1006 generates a replica of the feedback signal based on the filter tab coefficients generated by the filter coefficient generator 1005 and the output signal of the subtractor 1003, and feeds back the replica of the feedback signal to the subtractor 1003.

The filter coefficient generator 1005 calculates filter tab coefficients $\bar{h}_{now}$ based on a Least Mean Square (LMS) algorithm according to Equation 2.

$$\bar{h}_{now} = \bar{h}_{past} + \lambda \cdot \bar{e}$$

$$\bar{h}_{now} = [h_{now,0} h_{now,1} \ldots h_{now,M-1}]^T$$

$$\bar{h}_{past} = [h_{past,0} h_{past,1} \ldots h_{past,M-1}]^T$$

$$\bar{e} = [e_0 e_1 \ldots e_{M-1}]^T$$ Eq. 2 where $\bar{e}$ is an error signal of the channel calculated based on the channel distortion information of the estimated repeater reception channel; $\bar{h}_{past}$ is previous filter tab coefficients; $\lambda$ is a constant for determining a convergence speed; M is the number of filter tabs; and T is a transpose.

The second adaptive filter 1006 calculates a replica fb(n) of the feedback signal according to Equation 3 by filtering an output signal $\bar{y}_n = [y(n)y(n-1) \ldots y(n-M+1)]^T$ in a time index n outputted from subtractor 1003 based on a filter tab coefficients $\bar{h}_{now}$ generated by the filter coefficient generator 1005.

$$fb(n) = \bar{h}_{now}^T \bar{y}_n \qquad \text{Eq. 3}$$

According to next Equation 4, the subtractor 1003 removes the feedback signal caused by low isolation of the transmission/reception antenna by subtracting a replica fb(n) of the feedback signal outputted from the second adaptive filter 1006 from an output signal r(n) of the RF receiver 1002.

$$y(n) = r(n) - fb(n) \qquad \text{Eq. 4}$$

Figure 11:
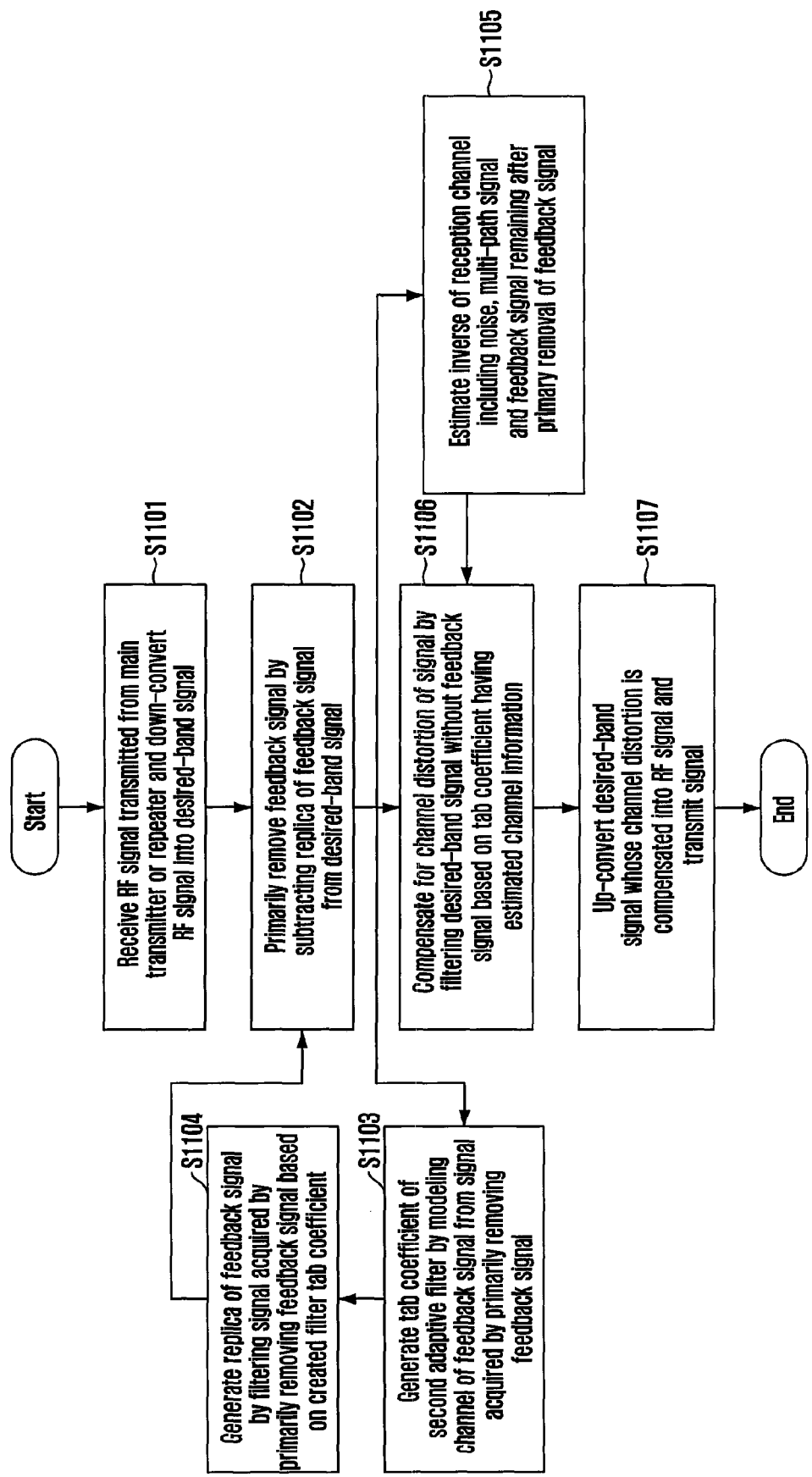
FIG. 11 is a flowchart illustrating the repeating method executed in the on-channel repeater of FIG. 8

FIG. 11 is a flowchart illustrating the repeating method in the on-channel repeater of FIG. 8.

Referring to FIG. 11, an RF signal transmitted from the main transmitter or another repeater is received through the reception antenna 1001, and is down-converted into a signal of a desired band in the RF receiver 1002 at step S1101.

The subtractor 1003 removes feedback signals from an output signal of the RF receiver 1002 by subtracting a replica of feedback signals generated in the second adaptive filter 1006 from the signal outputted from the RF receiver 1002 at step S1102.

The filter coefficient generator 1005 of the replica generator 1009 generates filter tab coefficients used in the second adaptive filter 1006 based on the signal outputted from the subtractor 1003, i.e., the signal acquired by removing the feedback signal, at step S1103. The second adaptive filter 1006 generates a replica of the feedback signal by filtering the output signal of the subtractor 1003 based on the filter tab coefficients generated in the filter coefficient generator 1005, and feeds back the replica of the feedback signal to the subtractor 1003 at step S1104.

The inverse channel estimator 1007 generates filter tab coefficients by estimating inverse of the reception channel including noise, multi-path signals and remaining feedback signals based on the signal outputted from the subtractor 1003 at step S1105.

The first adaptive filter 1008 compensates for channel distortion of the signal outputted from the subtractor 1003 based on the filter tab coefficients generated by the inverse channel estimator 1007 at step S1106.

The RF transmitter 1009 converts the signal outputted from the first adaptive filter 1008 into an RF signal and performs radio transmission through the transmission antenna 1010 at step S1107.

Figure 12:
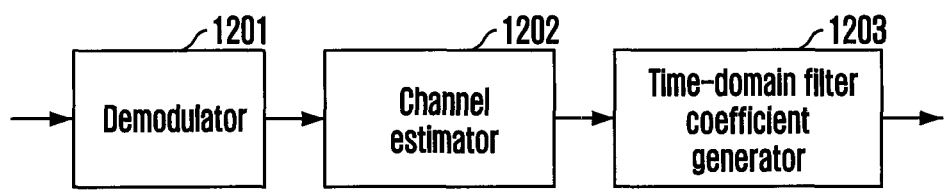
FIG. 12 is a block diagram illustrating a filter coefficient generator shown in FIG. 10.

FIG. 12 is a block diagram illustrating the filter coefficient generator 1005 of FIG. 10.

Referring to FIG. 12, the filter coefficient generator 1005 includes a demodulator 1201, a channel estimator 1202 and a time-domain filter coefficient generator 1203.

The demodulator 1201 demodulates the signal outputted from the subtractor 803 through a frequency and timing synchronizing procedure.

The channel estimator 1202 estimates channel distortion of a repeater reception channel including noise, multi-path signals and remaining feedback signals based on the signal demodulated by the demodulator 1201.

The time-domain filter coefficient generator 1203 generates an error signal $\bar{e}$ in a time domain based on the channel distortion information estimated in the channel estimator 1202 and generates filter tab coefficients according to Equation 2.

Figure 13:
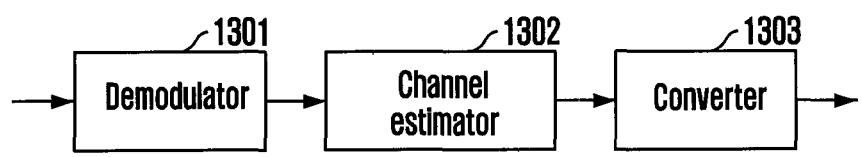
FIG. 13 is a block diagram illustrating an inverse channel estimator shown in FIG. 8

FIG. 13 is a block diagram illustrating the inverse channel estimator 805 of FIG. 8.

Referring to FIG. 13, the inverse channel estimator 1007 includes a demodulator 1301, a channel estimator 1302 and a converter 1303. The demodulator 1301 and the channel estimator 1302 perform the same functions as the demodulator 1201 and the channel estimator 1202 of FIG. 12.

The converter 1303 generates filter tab coefficients used in the first adaptive filter 806 by estimating inverse of the reception channel from the channel distortion information of the reception channel estimated by the channel estimator 1302.

The demodulators 1201 and 1301, the channel estimators 1202 and 1302, the time-domain filter coefficient generator 1203, and the converter 1303 of FIGS. 12 and 13 may be diversely formed according to a standard of a system Embodiments of the demodulators 1201 and 1301, the channel estimators 1202 and 1302, the time-domain filter coefficient generator 1203, and the converter 1303 in a DVB-T DTV standard using an Orthogonal Frequency Division Multiplexing modulating (OFDM) technique will be described with reference to FIGS. 14 to 17 hereinafter.

Figure 14:
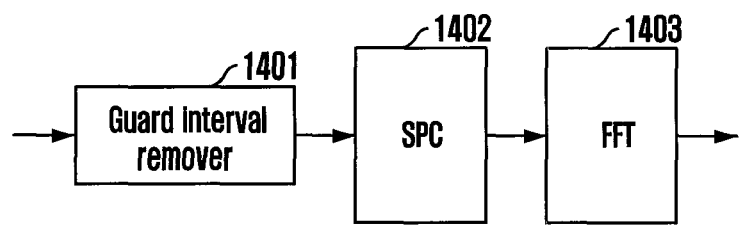
FIG. 14 is a block diagram showing a demodulator shown in FIGS. 12 and 13.

FIG. 14 is a block diagram showing the demodulators 1201 and 1301 of FIGS. 12 and 13 and it may be applied to the DVB-T DTV standard.

The demodulators 1201 and 1301 include a guard interval remover 1401, a serial-to-parallel converter (SPC) 1402, and a Fast Fourier Transformer (FFT) 1403.

The guard interval remover 1401 removes a guard interval from a signal outputted from the subtractor 1003 and the serial-to-parallel converter 1402 converts the signal whose guard interval is removed by the guard interval remover 1401 into a parallel signal. The Fast Fourier Transformer 1403 transforms the parallel signal converted by the serial-to-parallel converter 1402 into a frequency region.

Figure 15:
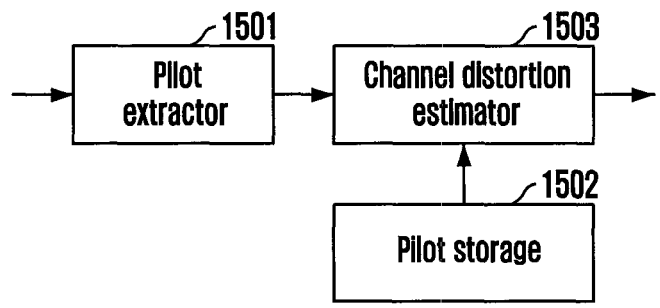
FIG. 15 is a block diagram showing a channel estimator shown in FIGS. 12 and 13.

FIG. 15 is a block diagram showing the channel estimators 1202 and 1302 of FIGS. 12 and 13 and it may be applied to the DVB-T DTV standard.

The channel estimators 1202 and 1302 include a pilot extractor 1501, a pilot storage 1502 and a channel distortion estimator 1503.

The pilot extractor 1501 extracts a pilot signal from the output signal of the demodulators 1201 and 1301. The pilot storage 1502 stores a pre-stored and predetermined pilot signal. The channel distortion estimator 1503 compares the pilot signal extracted by the pilot extractor 1501 with the pilot signal stored in the pilot storage 1502, and estimates channel distortion.

Figure 16:
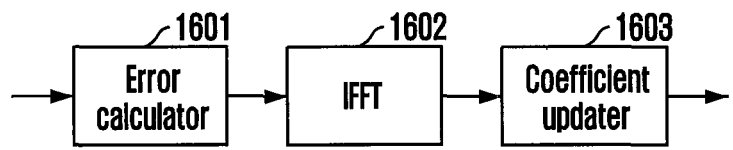
FIG. 16 is a block diagram showing a time-domain filter coefficient generator according to a DVB-T DTV standard.

FIG. 16 is a block diagram showing the time-domain filter coefficient generator 1203 of FIG. 12 and it may be applied to the DVB-T DTV standard.

The time-domain filter coefficient generator 1203 includes an error calculator 1601, an Inverse Fast Fourier Transformer (IFFT) 1602 and a coefficient updater 1603.

The error calculator 1601 generates an error signal based on the channel distortion information estimated by the channel estimator 1202. The Inverse Fast Fourier Transformer 1602 transforms the error signal generated by the error calculator 1601 into a time-domain signal The coefficient updater 1603 calculates tab coefficients according to Equation 2 based on the signal outputted from the Inverse Fast Fourier Transformer 1602.

Figure 17:
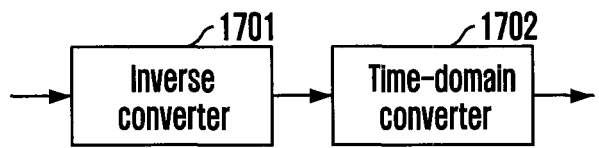
FIG. 17 is a block diagram showing a converter of an inverse channel estimator according to the DVB-T DTV standard.

FIG. 17 is a block diagram showing the converter 1303 of FIG. 13 and it may be applied to the DVB-T DTV standard.

The converter 1303 includes an inverse converter 1701 and a time-domain converter 1702.

The inverse converter 1701 generates inverse of channel distortion based on the channel distortion information estimated by the channel estimator 1302. The time-domain converter 1702 converts the inverse of the channel distortion generated from inverse converter 1701 into filter tab coefficients of the time domain.

Figure 18:
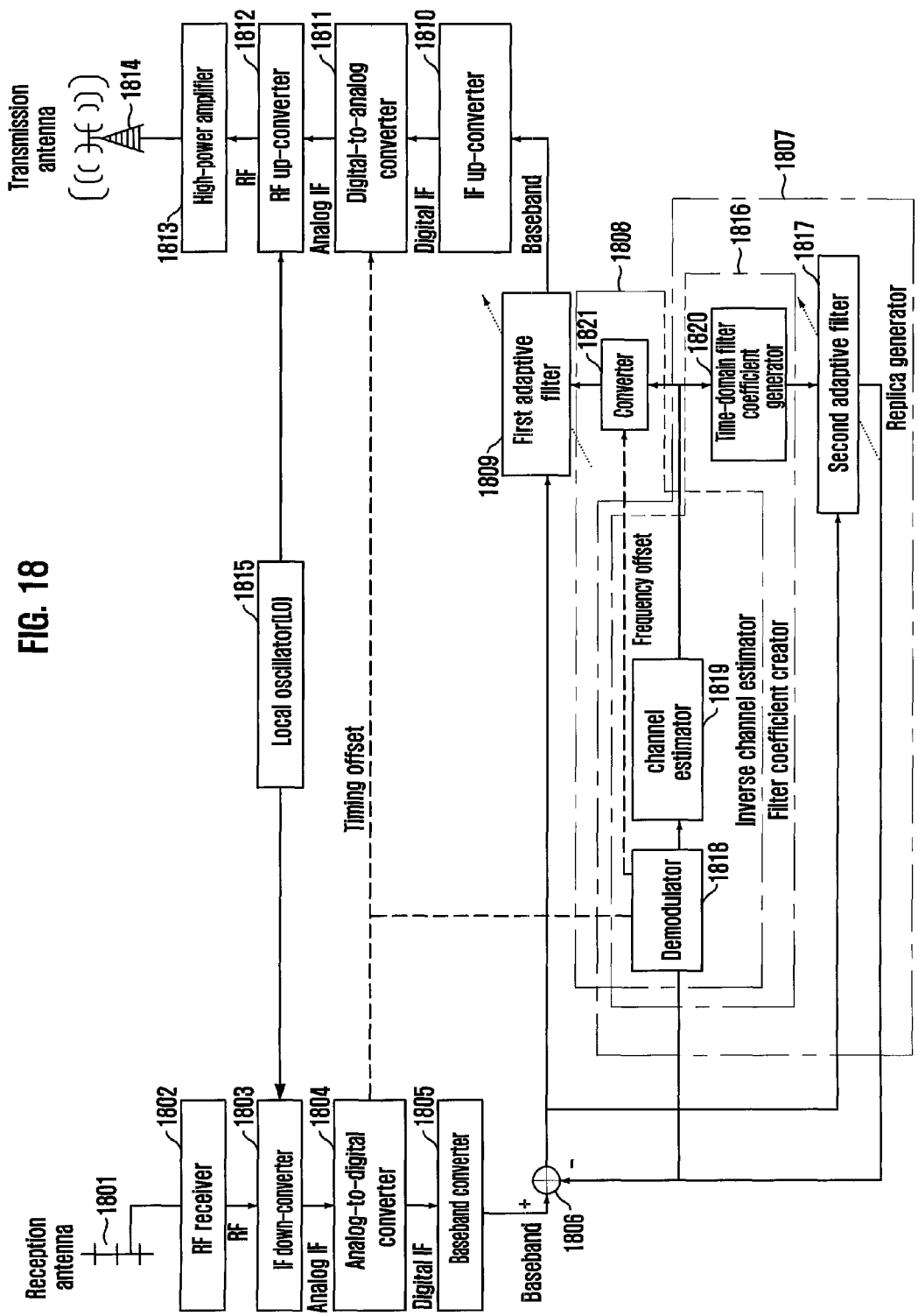
FIG. 18 is a block diagram showing an on-channel repeater in accordance with another embodiment of the present invention.

FIG. 18 is a block diagram showing the on-channel repeater in accordance with another embodiment of the present invention.

FIG. 18 has the same configuration as FIG. 8. A signal is converted into a baseband signal only in a transmitting/receiver.

Therefore, a subtractor 1806, a replica generator 1807, an inverse channel estimator 1808 and a first adaptive filter 1809 correspond to the subtractor 803, the replica generator 804, the inverse channel estimator 805 and the first adaptive filter 806.

The RF receiver 1802 receives an RF signal from the main transmitter or another repeater through the reception antenna 1801.

An IF down-converter 1803 down-converts the reception RF signal into an IF signal based on the reference frequency provided from a local oscillator 1815. The analog-to-digital converter 1804 converts an analog IF signal outputted from the IF down-converter 1803 into a digital IF signal. A baseband converter 1805 converts an output signal of the analog-to-digital converter 1804 into a baseband signal.

An IF up-converter 1810 converts a signal outputted from the first adaptive filter 1809 into an IF signal. The digital-to-analog converter 1811 converts a digital IF signal outputted from the IF up-converter 1810 into an analog IF signal. The RF up-converter 1812 up-converts an output signal of the digital-to-analog converter 1811 into an RF signal based on a reference frequency provided from the local oscillator 1815.

The RF signal up-converted by the RF up-converter 1812 is amplified by the high-power amplifier 1813 and is wirelessly transmitted through the transmission antenna 1814.

The local oscillator 1815 generates and provides a reference frequency to the IF down-converter 1803 and the RF up-converter 1812.

Although the on-channel repeating method and the on-channel repeater which improve feedback signal removing capacity in accordance with the present invention are proper to broadcastings such as ATSC, DVB, DMB and ISDB-T, and communications such as Wibro and CDMA, they are not limited to these examples and can be applied to anywhere in an environment which requires a repeater to configure a general single frequency network.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to certain preferred embodiments, it will be apparent to those skilled in the art that various changes and modifications may be made without departing from the scope of the invention as defined in the following claims.

INDUSTRIAL APPLICABILITY

The present invention can increase efficiency of limited frequency resources by repeating a signal that is the same as the output signal of a main transmitter, has a short time delay between the output signals of the repeater and the main transmitter, and has its distortion caused in a transmission channel compensated.

What is claimed is:

1. An on-channel repeater, comprising:
   a receiving means for receiving a Radio Frequency (RF) signal;
   a subtracting means for subtracting a replica of feedback signals from the signal received by the receiving means;
   a replica generating means for calculating the replica based on the signal acquired from the subtraction in the subtracting means and feeding back the replica to the subtracting means;
   an inverse channel estimating means for estimating inverse of a reception channel based on the signal acquired from the subtraction in the subtracting means and generating filter tab coefficients;
   a first adaptive filtering means for compensating for channel distortion of the signal subtracted by the subtracting means based on the filter tab coefficients generated in the inverse channel estimating means; and
   a transmitting means for converting a signal whose channel distortion is compensated by the first adaptive filtering means into an RF signal and performing radio transmission,
   wherein the filter tab coefficients are generated by using an error signal in a time domain based on the channel distortion of the reception channel, and
   wherein the filter tab coefficients are calculated by using a channel error signal calculated based on channel distortion information of a repeater reception channel, previous filter tab coefficients, a constant for determining a convergence speed, a number of filter tabs, and a transpose.

2. The on-channel repeater of claim 1, wherein the replica generating means includes:
   a filter coefficient generator for generating filter tab coefficients based on the signal acquired from the subtraction in the subtracting means; and
   a second adaptive filter for calculating the replica based on the signal acquired from the subtraction in the subtracting means and the filter tab coefficients generated in the filter coefficient generator, and feeding back the replica to the subtracting means.

3. The on-channel repeater of claim 2, wherein the filter coefficient generator includes:
   a demodulator for demodulating the signal subtracted by the subtracting means;
   a channel estimator for estimating channel distortion of the repeater reception channel based on the demodulated signal acquired in the demodulator; and
   a time-domain filter coefficient generator for generating filter tab coefficients in a time domain based on the channel distortion information estimated by the channel estimator.

4. The on-channel repeater of claim 3, wherein the time-domain filter coefficient generator includes:
   an error calculator for generating an error signal based on the channel distortion information of the repeater reception channel estimated by the channel estimator;
   an Inverse Fast Fourier Transformer (IFFT) for transforming the error signal generated by the error calculator into a time-domain signal; and
   a coefficient updater for calculating a filter tab coefficients based on the time-domain signal transformed in the Inverse Fast Fourier Transformer.

5. The on-channel repeater of claim 3, wherein the demodulator includes:
   a guard interval remover for removing a guard interval of a signal subtracted by the subtracting means;

a serial-to-parallel converter (SPC) for converting the signal whose guard interval is removed by the guard interval remover into a parallel signal; and Fast Fourier Transformer for transforming the parallel signal converted by the serial-to-parallel converter into a frequency region.

6. The on-channel repeater of claim 3, wherein the channel estimator includes:
a pilot extractor for extracting a pilot signal from the signal demodulated by the demodulator;
a pilot storage for storing a predetermined pilot signal; and
a channel distortion estimator for estimating distortion of a channel by comparing the pilot signal extracted from the pilot extractor with the pilot signal stored in the pilot storage.

7. The on-channel repeater of claim 3, wherein the time-domain filter coefficient generator calculates the filter tab coefficients based on a Least Mean Square (LMS) algorithm.

8. The on-channel repeater of claim 7, wherein the time-domain filter coefficient generator calculates the filter tab coefficients $\bar{h}_{now}$ according to Equation 1:

$$\bar{h}_{now} = \bar{h}_{past} + \lambda \cdot \bar{e}$$

$$\bar{h}_{now} = [h_{now,0} h_{now,1} \ldots h_{now,M-1}]^T$$

$$\bar{h}_{past} = [h_{past,0} h_{past,1} \ldots h_{past,M-1}]^T$$

$$\bar{e} = [e_0 e_1 \ldots e_{M-1}]^T \quad \text{Eq. 1}$$

where is $\bar{e}$ the channel error signal calculated based on the channel distortion information of the repeater reception channel estimated by the channel estimator; $\bar{h}_{past}$ is the previous filter tab coefficients; $\lambda$ is the constant for determining the convergence speed; M is the number of filter tabs; and T is the transpose.

9. The on-channel repeater of claim 8, wherein the second adaptive filter calculates the replica fb(n) according to Equation 2:

$$fb(n) = \bar{h}_{now}^T \bar{y}_n \quad \text{Eq. 2}$$

where $\bar{y}_n = [y(n) y(n-1) \ldots y(n-M+1)]^T$ is a signal vector subtracted from a time index n by the subtracting means.

10. The on-channel repeater of claim 7, wherein the subtracting means subtracts the replica from the signal received by the receiving means according to Equation 3:

$$y(n) = r(n) - fb(n) \quad \text{Eq. 3}$$

where r(n) is a signal received in the time index n by the receiving means, and y(n) is a signal subtracted from the time index n by the subtracting means.

11. The on-channel repeater of claim 1, wherein the inverse channel estimating means includes:
a demodulator for demodulating the signal acquired form the subtraction in the subtracting means;
a channel estimator for estimating channel distortion information of the repeater reception channel based on the signal demodulated by the demodulator; and
a converter for calculating inverse of the reception channel based on the channel information estimated by the channel estimator and generating a filter tab coefficients based on the inverse of the calculated reception channel.

12. The on-channel repeater of claim 11, wherein the converter includes:
an inverse converter for generating inverse of channel distortion based on the channel distortion information estimated by the channel estimator; and a time-domain converter for converting an inverse of the channel distortion generated by the inverse converter into a filter tab coefficients of a time domain.

13. The on-channel repeater of claim 1, wherein the receiving means includes:
an RF receiver for receiving an RF signal;
an Intermediate Frequency (IF) down-converter for down-converting the RF signal received by the RF receiver into the RF signal of an IF band;
an analog-to-digital converter for converting the signal converted by the IF down-converter into a digital IF signal; and
a baseband converter for converting the digital IF signal converted by the analog-to-digital converter into a baseband signal.

14. The on-channel repeater of claim 1, wherein the transmitting means includes:
an IF up-converter for converting the signal whose channel distortion is compensated by the first adaptive filtering means into a digital IF signal;
a digital-to-analog converter for converting the digital IF signal converted by the IF up-converter into an analog IF signal;
an RF up-converter for up-converting the signal converted by the digital-to-analog converter into an RF signal; and
a high-power amplifier for amplifying the RF signal converted by the RF up-converter.

15. An on-channel repeating method, comprising:
receiving a Radio Frequency (RF) signal;
subtracting a replica of feedback signals from the received signal;
estimating an inverse of a reception channel based on a signal acquired from the subtraction and generating a filter tab coefficients;
compensating for channel distortion of the signal acquired from the subtraction based on the filter tab coefficients generated in said estimating the inverse of the reception channel; and
converting the signal whose channel distortion is compensated into an RF signal and performing radio transmission,
wherein the replica is calculated based on the signal acquired from the subtraction and is fed back to said subtracting the replica of the feedback signal, and
wherein the filter tab coefficients are generated by using an error signal in a time domain based on the channel distortion of the reception channel, and
wherein the filter tab coefficients are calculated by using a channel error signal calculated based on channel distortion information of a repeater reception channel, previous filter tab coefficients, a constant for determining a convergence speed, a number of filter tabs, and a transpose.

16. The method of claim 15, wherein the replica is calculated by:
generating a filter tab coefficients based on the signal acquired from the subtraction; and
calculating the replica based on the signal acquired from the subtraction and the filter tab coefficients generated in said generating the filter tab coefficients.

17. The method of claim 16, wherein said generating the filter tab coefficients includes:
demodulating the signal acquired from the subtraction;
estimating channel distortion of the repeater reception channel based on the signal demodulated in said demodulating the signal; and generating a filter tab coefficients in a time domain based on the channel distortion information estimated in said estimating channel distortion.

18. The method of claim 17, wherein said generating the filter tab coefficients in the time domain includes:
generating an error signal based on the estimated channel distortion information of the repeater reception channel;
transforming the error signal into a time-domain signal; and
calculating the filter tab coefficients based on the time-domain signal acquired from the transformation in said transforming the error signal.

19. The method of claim 17, wherein said demodulating the signal includes:
removing a guard interval of the signal acquired from the subtraction in said subtracting the replica of the feedback signal;
converting the signal whose guard interval is removed into a parallel signal; and
transforming the parallel signal acquired from the conversion in said converting the signal into the parallel signal into a frequency domain.

20. The method of claim 17, wherein said estimating the channel distortion includes:
extracting a pilot signal from the demodulated signal;
storing a predetermined pilot signal; and
estimating channel distortion by comparing the pilot signal extracted in said extracting the pilot signal with the pilot signal stored in said storing the predetermined pilot signal.

21. The method of claim 17, wherein in said generating the filter tab coefficients in the time domain,
the filter tab coefficients is calculated based on a Least Mean Square (LMS) algorithm.

22. The method of claim 21, wherein in said generating the filter tab coefficients in the time domain,
the filter tab coefficients $\bar{h}_{now}$ is calculated according to Equation 1:

$$\bar{h}_{now} = \bar{h}_{past} + \lambda \cdot \bar{e}$$

$$\bar{h}_{now} = [h_{now,0} h_{now,1} \ldots h_{now,M-1}]^T$$

$$\bar{h}_{past} = [h_{past,0} h_{past,1} \ldots h_{past,M-1}]^T$$

$$\bar{e} = [e_0 e_1 \ldots e_{M-1}]^T \qquad \text{Eq. 1}$$

Where is $\bar{e}$ the error signal of the channel calculated based on the channel distortion information of the repeater reception channel estimated in said estimating the channel distortion; $\bar{h}_{past}$ is the previous filter tab coefficients; $\lambda$ is the constant for determining the convergence speed; M is the number of filter tabs; and T is the transpose.

23. The method of claim 22, wherein the replica fb(n) is calculated according to Equation 2:

$$fb(n) = \bar{h}_{now}^T \bar{y}_n \qquad \text{Eq. 2}$$

where $\bar{y}_n = [y(n)y(n-1) \ldots y(n-M+1)]^T$ is a signal vector subtracted in said subtracting the replica of the feedback signal in a time index n.

24. The method of claim 23, wherein the replica is subtracted from the signal received in said receiving the RF signal according to Equation 3:

$$y(n) = r(n) - fb(n) \qquad \text{Eq. 3}$$

where r(n) is the signal received in said receiving the RF signal in the time index n and y(n) is the signal acquired from the subtraction in said subtracting the replica of the feedback signal in the time index n.

25. The method of claim 15, wherein said estimating the inverse of the reception channel includes:
demodulating the signal acquired from the subtraction in said subtracting the replica of the feedback signal;
estimating channel distortion information of the repeater reception channel based on the signal demodulated in said demodulating the signal; and
calculating an inverse of the reception channel based on the channel information estimated in said estimating the channel distortion and generating a filter tab coefficients based on the calculated inverse of the reception channel.

26. The method of claim 25, wherein said calculating inverse of the reception channel and generating the filter tab coefficients includes:
generating an inverse of channel distortion based on the estimated channel distortion information; and
converting the inverse of the generated channel distortion into a filter tab coefficients of a time domain.

27. The method of claim 15, wherein said receiving the RF signal includes:
receiving an RF signal;
down-converting the RF signal received in said receiving the RF signal into the signal of an Intermediate Frequency (IF) band;
converting the signal acquired in the down-converting the RF signal into a digital IF signal; and
converting the digital IF signal into a baseband signal.

28. The method of claim 15, wherein said converting the signal into the RF signal and performing radio transmission includes:
converting the signal whose channel distortion is compensated into a digital IF signal;
converting the digital IF signal into an analog IF signal;
up-converting the analog IF signal into an RF signal; and
amplifying the RF signal.

* * * * *